United States Patent [19]
Kobayashi et al.

[11] Patent Number: 5,871,864
[45] Date of Patent: Feb. 16, 1999

[54] LITHIUM SECONDARY CELLS AND METHODS FOR PREPARING ACTIVE MATERIALS FOR NEGATIVE ELECTRODES

[75] Inventors: Yuukichi Kobayashi, Tokyo; Hidehiko Ohara, Yokohama; Kenji Watanabe; Kazuo Niwa, both of Kagawa, all of Japan

[73] Assignee: Mitsubishi Chemical Corporation, Tokyo, Japan

[21] Appl. No.: 739,295

[22] Filed: Oct. 29, 1996

[30] Foreign Application Priority Data

Oct. 30, 1995 [JP] Japan ................................ 7-303337
Mar. 12, 1996 [JP] Japan ................................ 8-054850
Mar. 14, 1996 [JP] Japan ................................ 8-057538

[51] Int. Cl.[6] .................................................. H01M 4/58
[52] U.S. Cl. ........................ 429/218; 423/449.4; 423/460
[58] Field of Search ..................... 429/218; 423/449.4, 423/460

[56] References Cited

U.S. PATENT DOCUMENTS 4,565,649  1/1986  Vogel ......................................... 423/460
4,780,112  10/1988  Lloyd et al. ............................... 423/460
5,328,782  7/1994  Binder et al. ............................. 429/101
5,527,643  6/1996  Sonobe et al. ........................... 429/218
5,556,723  9/1996  Ohsaki et al. ........................... 429/218
5,589,289  12/1996  Zhang et al. ............................ 429/218
5,622,793  4/1997  Iijima et al. ............................. 429/218

Primary Examiner—Stephen Kalafut
Assistant Examiner—Carol Chaney
Attorney, Agent, or Firm—Oblon, Spivak, McClelland, Maier & Neustadt, P.C.

[57] ABSTRACT

A lithium secondary cell wherein a carbon material treated with a fluorinating agent and having substantially no C-F covalent bond, is used as an active material for negative electrode, provides a secondary cell having improved cell life. Further, a lithium secondary cell wherein a carbon material treated with a fluorinating agent and having an amount of fluorine extractable with an aqueous alkaline solution being at most 0.05 wt %, is used as an active material for negative electrode, or a lithium secondary cell wherein a carbon material treated with a fluorinating agent and containing lithium, is used as an active material for negative electrode, provides a secondary cell which is free from a problem of expansion of the casing during charging due to fluorine remaining in a small amount in the cell.

14 Claims, No Drawings

LITHIUM SECONDARY CELLS AND METHODS FOR PREPARING ACTIVE MATERIALS FOR NEGATIVE ELECTRODES

BACKGROUND OF THE INVENTION

1. Field of the Invention

The present invention relates to lithium secondary cells and methods for preparing active materials for negative electrodes for the lithium secondary cells.

2. Discussion of Background

With rapid progress of electronic technology in recent years, trend for small sizes and light weights of electronic appliances is remarkable, and expectation for cells as their power sources is likewise high. Namely, there is substantial expectation for cells provided with excellent storage stability as well as high energy density with small sizes and light weights.

As the most prospective cell system to satisfy such expectation, a research has been active for developing lithium cells wherein lithium is used as the negative electrode. By virtue of their excellent properties, lithium secondary cells have been rapidly put on market as portable power sources for e.g. VTR cameras, portable telephones or personal computers. However, such cells usually have a difficulty that no adequate charge-discharge cycle life can be obtained.

Therefore, it has been proposed to use, as negative electrode materials, carbon-lithium intercalation compounds having lithium ions intercalated to various carbon materials, and various carbon materials suitable for this purpose have been studied.

For example, it has been proposed to use, as a negative electrode material, graphite such as natural graphite, or a carbon material prepared by baking various resins or pitches. However, a further improvement in the cell performance is still desired to make it applicable to a large size cell useful for a so-called dispersion type power storage system such as a system for domestic power storage at night or for electric vehicle.

SUMMARY OF THE INVENTION

Under these circumstances, the present inventors have conducted various studies with an aim to obtain a negative electrode material for a lithium secondary cell, which makes it possible to further prolong the cell life, and as a result, have arrived at a first aspect of the present invention.

Whereas, a small amount of fluorine remains in the carbon negative electrode material treated by the first aspect of the present invention, whereby a problem sometimes occurs such that after preparation of a cell, such fluorine evaporates during charging, so that the casing of the cell is likely to be expanded. If this phenomenon occurs, the liquid surface of the electrolyte lowers, which brings about not only a decrease in capacitance but also a serious problem in safety. Accordingly, solution of this problem is desired.

Accordingly, the present inventors have conducted various studies with an aim to remove fluorine remaining in the carbon negative electrode material treated with the fluorinating agent and as a result, have arrived at second and third aspects of the present invention.

That is, in the first aspect, the present invention provides a lithium secondary cell, wherein a carbon material treated with a fluorinating agent and having substantially no C-F covalent bond, is used as an active material for negative electrode, and a method for preparing an active material for negative electrode for a lithium secondary cell, which comprises subjecting a surface of a carbon material to fluorine-containing gas treatment by contacting a fluorine-containing gas thereto at a temperature of from 0° to 30° C. for from 1 minute to 2 days.

In the second aspect, the present invention provides a lithium secondary cell, wherein a carbon material treated with a fluorinating agent and having an amount of fluorine extractable with an aqueous alkaline solution being at most 0.05 wt %, is used as an active material for negative electrode, and a method for preparing an active material for negative electrode for a lithium secondary cell, which comprises treating a carbon material with a fluorinating agent and then contacting it with a steam-containing gas in a heated atmosphere.

In the third aspect, the present invention provides a lithium secondary cell, wherein a carbon material treated with a fluorinating agent and containing lithium, is used as an active material for negative electrode, and a method for preparing an active material for negative electrode for a lithium secondary cell, which comprises treating a carbon material with a fluorinating agent and then adding lithium metal and/or a lithium compound other than lithium fluoride, to the carbon material.

DETAILED DESCRIPTION OF THE PREFERRED EMBODIMENTS

Firstly, the carbon material to be used in the present invention may, for example, be coke prepared from various pitches as starting materials, a resin-type carbon material obtained by baking e.g. a phenol resin, or natural or artificial graphite. Coke is preferably employed.

Such coke may be the one prepared by subjecting petroleum based heavy oil such as a FCC (fluidized catalytic cracking) residual oil, an EHE oil (a by-product oil from ethylene production), a normal pressure residual oil or a reduced pressure residual oil, or a coal tar based carbon material such as coal tar or coal tar pitch, to delayed coking at a temperature of from 400° to 500° C., followed by baking at a temperature of from 1,000° to 1,5000° C.

The carbon material is used usually in the form of particles. The particle size is not particularly limited so long as it is not too large to be used for an electrode for a cell.

In the present invention, such a carbon material is treated with a fluorinating agent, usually in the particle form, or in some cases, after being formed into a negative electrode shape. As the fluorinating agent, a substance which supplies fluorine atoms, such as fluorine gas, may be employed.

The treating temperature with the fluorinating agent is selected within a temperature range in which substantially no C-F covalent bond will be formed, i.e. from −100° C. to 90° C., preferably from 0° to 30° C. The treating time with the fluorinating agent may be short so long as fluorine is uniformly supplied to the carbon material, and even if the time is prolonged, no corresponding effects can be expected. Therefore, the treating time is usually from 1 minute to 2 days, preferably not longer than 30 minutes. The fluorine partial pressure of fluorine gas is not particularly limited and may be under elevated or reduced pressure. However, the treatment is preferably conducted under a pressure of from 1 mmHg to 100 mmHg.

The fluorine gas or the like may be used alone or may be used as mixed with an inert gas such as argon, or with oxygen gas or the like. It is particularly preferred to use it as mixed with oxygen gas.

The fluorinated carbon material thus obtained has the following properties. Namely, it does not have a distinct peak at from 1,000 to 1,200 kayser attributable to a C-F bond by the FT-IR measurement. Of course, the C-F bond may partially be formed, but it must be at most 1%.

In the second aspect of the present invention, the amount of fluorine extractable with an aqueous alkaline solution is reduced to a level of at most 0.05 wt % by subjecting the above fluorinated carbon material to treatment for removal of alkali extractable fluorine.

The treatment for removal of alkali extractable fluorine may be carried out to the above fluorinated carbon material prior to forming it into a negative electrode material.

The treatment for removal of alkali extractable fluorine is carried out by contacting the fluorinated carbon material with a steam-containing gas in a heated atmosphere. The steam-containing gas may usually be air and/or an inert gas such as nitrogen or argon, which contains from 1 to 60 vol %, preferably from 10 to 40 vol %, of steam. The flow rate of the steam-containing gas is usually from 50 to 1,000 ml/min, preferably from 200 to 300 ml/min, per 50 g of the carbon material. The temperature for the treatment is usually from 150° to 350° C., preferably from 200° to 300° C. The treating time is usually from a few minutes to a few tens hours, preferably from 1 to 10 hours. The treating apparatus is not particularly limited so long as it is thereby possible to carry out the contact of the carbon material with the steam-containing gas satisfactorily. However, it is preferred to use the same apparatus as used for the fluorinating treatment, to conduct the steam treatment following the fluorinating treatment.

The amount of fluorine extractable with an aqueous alkaline solution after the fluorinating treatment prior to the treatment for removal of the alkali extractable fluorine, varies also depending upon the fluorinating treatment conditions, but it is usually at a level of 0.1 wt %. In the lithium secondary cell according to the second aspect of the present invention, a carbon material having such an alkali extractable fluorine removed to a level of at most 0.05 wt %, is used as an active material for negative electrode. Here, the amount of fluorine extractable with an aqueous alkaline solution (hereinafter referred to as alkali extractable fluorine) can be determined by a method wherein a sample is added to an aqueous alkaline solution such as an aqueous sodium hydroxide solution or an aqueous potassium hydroxide solution having a concentration of from 0.1 to 1N, followed by sufficient extraction, whereupon the concentration of fluorine ions in the filtrate passed through a filter, is measured by ion chromatography.

On the other hand, in the third aspect of the present invention, the fluorinated carbon material is subjected to treatment for fixing the alkali extractable fluorine to the carbon material. The treatment for fixing the alkali extractable fluorine may be carried out to the above fluorinated carbon material either before or after forming it into a negative electrode material. By such fixing treatment, the amount of fluorine extractable with the above aqueous alkaline solution is reduced preferably to a level of at most 0.05 wt %.

In the third aspect of the present invention, the treatment for fixing the alkali extractable fluorine is carried out by adding lithium metal and/or a lithium compound other than lithium fluoride, to the carbon material. In a case where a powder of lithium metal is added to the carbon material, a particulate carbon material and a powder of lithium metal may be mixed. In a case where a lithium compound other than lithium fluoride is to be added to the carbon material, the carbon material may be dipped in a dispersion or solution having the lithium compound other than lithium fluoride, such as lithium hydroxide, dispersed or dissolved in a lower boiling point solvent such as water or alcohol, or such a dispersion or solution may be sprayed to the carbon material.

The amount of lithium in the lithium metal and/or the lithium compound other than lithium fluoride, to be added, may be at a level of 1.5 times in reaction equivalent, to the amount of the alkali extractable fluorine in the carbon material prior to the fixing treatment. After the addition, the solvent may be removed, for example, by heating, as the case requires.

In the lithium secondary cell according to the third aspect of the present invention, a carbon material containing lithium, which has been treated with a fluorinating agent, followed by the treatment for fixing the alkali extractable fluorine, as mentioned above, is used as an active material for negative electrode.

The treated carbon material obtained by the above treatment, may be mixed as an active material for negative electrode, with a binder or the like, by a conventional method, to obtain a negative electrode.

A positive electrode and an electrolyte having an electrolyte substance dissolved in a non-aqueous solvent, may be those commonly used for non-water type secondary cells heretofore, and they are not particularly limited.

Specifically, for the positive electrode, $LiCoO_2$, $MnO_2$, $TiS_2$, $FeS_2$, $Nb_3S_4$, $Mo_3S_4$, $Mo_3Se_4$, $CoS_2$, $V_2O_5$, $P_2O_3$, $CrO_3$, $V_3O_8$, $TeO_2$ or $GeO_2$ may, for example, be used. As the electrolyte substance, $LiClO_4$, $LiBF_4$ or $LiPF_6$ may, for example, be employed. The non-aqueous solvent for such an electrolyte may, for example, be propylene carbonate, tetrahydrofuran, 1,2-dimethoxyethane, dimethylsulfoxide, dioxorane, dimethylformamide, dimethylacetamide, or a solvent mixture of two or more of them.

As a separator, a porous material is preferred in order to reduce the internal resistance of the cell. For example, a non-woven fabric of e.g. polypropylene, or a separator made of a organic solvent resistant material such as glass filter, is preferably employed.

The negative electrode, the positive electrode, the electrolyte and the separator may be assembled into a secondary cell by a common method, for example by assembling them in a cell casing made of e.g. stainless steel, nickel-plated stainless steel or polypropylene. The cell structure may be a spiral structure in which strip-shaped positive and negative electrodes are spirally wound with a separator interposed therebetween. Otherwise, it is possible to employ a method wherein a pellet-like positive electrode and a disk-shaped negative electrode are inserted with a separator interposed therebetween, in a button-shaped casing. When it is applied to a large size battery, it is common to employ a so-called angular battery structure wherein a plurality of cells are laminated.

Now, the present invention will be described in further detail with reference to Examples, but it should be understood that the present invention is by no means restricted to such specific Examples.

EXAMPLE 1

Ethylene bottom oil (EHE) with BMCI (Bureau or Mines Correlation Index: showing the fractional properties of the material)=92.8, elemental analytical value=92.8 wt % and H=7.2 wt %, was put into a 4 l autoclave in an amount of 3.5 kg, and the temperature was raised from room temperature to 350° C. in one hour and then maintained at 350° C. for one hour. Thereafter, the temperature was raised to 480° C. at a rate of 10° C./hr and further maintained at 480° C. for 30 hours. After cooling to room temperature, the carbon material was taken out from the autoclave. Then, the carbon material of block-shape taken out from the autoclave, was pulverized by a jet mill to a particle size of from 10 to 44 μm, and the pulverized material was heated in a porcelain to 1,200° C. at a temperature raising rate of 300° C./hr to obtain a coke of the present invention. The elemental analytical values of the coke are shown in Table 1.

This coke was mixed with a binder and formed into a block, followed by baking. Then, the block-shaped product was cut into a size of a working electrode, and the product was put into a reactor for fluorination treatment. After maintaining the interior of the reactor in a vacuumed condition, a fluorine-containing gas ($F_2$: 8 vol %, $N_2$:92 vol %) was introduced, and fluorination treatment was carried out under atmospheric pressure for 10 minutes.

After the fluorination, the product was once washed to remove $F_2$ adsorbed on the surface and then thoroughly dried at 50° C.

Using the obtained negative electrode as a working electrode and using lithium metal for a counter electrode and a reference electrode, lithium was occluded in the negative electrode until the potential became 0V. Using electrolytic manganese dioxide as a positive electrode and propylene carbonate having $LiClO_4$ dissolved in a concentration of 1 mol/l therein, as an electrolyte, a lithium secondary cell was prepared by a usual method.

Then, the discharge characteristics of the lithium secondary cell were measured.

The measurement was carried out under a constant current charge and discharge of 50 mA/g (negative electrode carbon base), and the service capacity was a capacity until the cell voltage dropped to 2.0V. As a reference, measurement was carried out under the same condition with respect to a conventional lithium secondary cell wherein a coke obtained in the same manner as above except that no fluorination treatment was applied, was used. The results are shown in Table 2.

As is evident from Table 2, as compared with the conventional lithium secondary cell wherein a carbon negative electrode which was subjected to no fluorination treatment, was used, the lithium secondary cell of the present invention wherein the coke subjected to fluorination treatment was used, had a remarkably large service capacity, as the wettability with the electrolyte was improved.

TABLE 1

| O/C | 0.0011 |
| S/C | <0.0003 |
| N/C | <0.0026 |
| C wt % | 99.84 |

TABLE 2

| Carbon material | Service capacity (Ah/kg) First cycle |
| --- | --- |
| Fluorinated coke | 300 |
| Non-treated coke | 250 |

EXAMPLE 2

Green coke having a volatile component of 5.8 wt % obtained by coking coal tar in a coke drum at a temperature of from 450° to 500° C. for 24 hours, was finely pulverized by a jet mill to obtain a fine powder of green coke having an average particle size of 8.8 μm and a maximum particle size of at most 35 μm. This fine powder of green coke was placed in a tray made of graphite and heated to 1,200° C. at a temperature raising rate of about 10° C./min in a nitrogen atmosphere in a box-shaped electric furnace and maintained for two hours to obtain a carbon material.

The carbon material was put into a 10 l reactor. While maintaining the interior of the reactor in a vacuumed condition, a fluorine-containing gas ($F_2$:20 mmHg, $O_2$: 660 mmHg) was introduced, and fluorination treatment was carried out at room temperature under atmospheric pressure for 30 minutes. After the fluorination treatment, the residual gas was removed from the reactor, and then the temperature was raised to 200° C., and treatment was carried out for 2 hours while introducing 600 ml/min of air containing 25 vol % of saturated steam.

The amount of alkali extractable fluorine in the carbon material thus obtained, was measured by means of a 1N sodium hydroxide aqueous solution and found to be 0.02 wt %, which was substantially lower than 0.1 wt % in the carbon material which was not subjected to the fluorine removal treatment.

This carbon material was mixed with polyvinylidene fluoride (PVDF) and dimethylformamide (DMF) to obtain a paste, which was coated on a metal plate and dried and pressed to obtain a negative electrode.

On the other hand, for a positive electrode, $LiCoO_2$ was mixed with acetylene black, PVDF and DMF to obtain a paste, which was coated on a metal plate and dried and pressed to obtain a positive electrode.

The positive electrode and the negative electrode were insulated with a separator of polyolefin.

As an electrolyte, the one prepared by dissolving $LiPF_6$ in a solvent mixture of propylene carbonate (PC) and diethyl carbonate, was used.

These materials were set in a cell casing made of polypropylene with a width of 70 mm, and sealed to obtain a lithium secondary cell.

This cell was subjected to charging and discharging at a constant current of 30 A, whereby no expansion of the cell casing was observed even after completion of the charge-discharge of 10 cycles. The results are shown in Table 3.

COMPARATIVE EXAMPLE 1

A lithium secondary cell was prepared in the same manner as in Example 2 except that the carbon material subjected to the fluorination treatment in the same manner as in Example 2, was used directly as a carbon material for negative electrode without carrying out the fluorine removal treatment.

This cell was subjected to charging and discharging repeatedly in the same manner as in Example 2, whereby the initial width of 70 mm of the cell casing expanded to 81.5 mm by seven cycles. Consequently, the liquid surface of the electrolyte lowered substantially. The results are shown in Table 3.

COMPARATIVE EXAMPLE 2

The carbon material subjected to fluorination treatment in the same manner as in Example 2, was treated at 200° C. for 2 hours while introducing air containing no steam at a rate of 600 ml/min.

The amount of alkali extractable fluorine in the obtained carbon material was measured and found to be 0.09 wt %, which was substantially the same as 0.1 wt % before the treatment. A lithium secondary cell was prepared in the same manner as in Example 2 except that this carbon material was used as the carbon material for negative electrode.

This cell was subjected to charging and discharging repeatedly in the same manner as in Example 2, whereby the initial width of 70 mm of the cell casing expanded to 81.0 mm by 7 cycles. Consequently, the liquid surface of the electrolyte lowered substantially. The results are shown in Table 3.

TABLE 3

|  | Treating method | F content in treated product (wt %) | Expansion (mm) of cell casing |
|---|---|---|---|
| Example 2 | Treatment with a steam-containing gas | 0.02 | 0 |
| Comparative Example 1 | No treatment | 0.10 | 11.5 |
| Comparative Example 2 | Treatment with a gas containing no steam | 0.09 | 11.0 |

EXAMPLE 3

Green coke having a volatile content of 5.8% obtained by coking coal tar in a coke drum at a temperature of from 450° to 500° C. for 24 hours, was finely pulverized by a jet mill to obtain a fine powder of green coke having an average particle size of 8.8 μm and a maximum particle size of at most 35 μm. This fine powder of green coke was placed in a tray made of graphite and heated to 1,200° C. at a temperature raising rate of about 10° C./min in a nitrogen atmosphere in a box-shaped electric furnace and maintained for two hours to obtain a carbon material.

The carbon material was put into a 10 l reactor, and while maintaining the interior of the reactor under a vacuumed condition, a fluorine-containing gas ($F_2$:20 mmHg, $O_2$: 660 mmHg) was introduced, and fluorination treatment was carried out at room temperature under atmospheric pressure for 30 minutes.

To the fluorinated carbon material, a saturated aqueous solution of lithium hydroxide (LiOH) was sprayed, and then water was removed in a dryer. The amount of LiOH to the carbon material was adjusted so that it would be 1.5 times in reaction molar amount to the amount of alkali extractable fluorine in the carbon material. The carbon material after drying was examined by X-ray diffraction, whereby a diffraction line of LiF was observed. The amount of alkali extractable fluorine in the obtained carbon material was measured by means of a 1N sodium hydroxide aqueous solution and found to be 0 wt %.

This carbon material was mixed with polyvinylidene fluoride (PVDF) and dimethylformamide (DMF) to obtain a paste, which was coated on a metal plate and dried and pressed to obtain a negative electrode.

On the other hand, for a positive electrode, $LiCoO_2$ was mixed with acetylene black, PVDF and DMF to obtain a paste, which was coated on a metal plate and dried and pressed to obtain a positive electrode.

The positive electrode and the negative electrode were insulated by a separator of polyolefin.

As the electrolyte, the one having $LiPF_6$ dissolved in a solvent mixture of propylene carbonate (PC) and diethyl carbonate, was used.

These materials were set in a cell casing made of polypropylene with a width of 70 mm and sealed to obtain a lithium secondary cell.

This cell was subjected to charging and discharging repeatedly at a constant current of 30 A, whereby no expansion of the cell casing was observed even after completion of the charge and discharge of 10 cycles. The results are shown in Table 4.

COMPARATIVE EXAMPLE 3

A lithium secondary cell was prepared in the same manner as in Example 3 except that the carbon material subjected to fluorination treatment in the same manner as in Example 3, was used directly as a carbon material for negative electrode without carrying out fluorine fixing treatment.

This cell was subjected to charging and discharging repeatedly in the same manner as in Example 3, whereby the initial width of 70 mm of the cell casing expanded to 81.5 mm. Consequently, the liquid surface of the electrolyte lowered substantially. The results are shown in Table 4.

COMPARATIVE EXAMPLE 4

To the carbon material subjected to fluorination treatment in the same manner as in Example 3, only water was sprayed in the same amount as the LiOH saturated aqueous solution in Example 3, and then water was removed in a drier.

A lithium secondary cell was prepared in the same manner as in Example 3 except that the obtained carbon material was used as a carbon material for negative electrode.

This cell was subjected to charging and discharging repeatedly in the same manner as in Example 3, whereby the initial width of 70 mm of the cell casing expanded to 80.0 mm. Consequently, the liquid surface of the electrolyte lowered substantially. The results are shown in Table 4.

TABLE 4

|  | Treating method | F content in treated product (wt %) | Expansion (mm) of cell casing |
|---|---|---|---|
| Example 3 | Treatment with a aqueous lithium hydroxide solution | 0 | 0 |
| Comparative Example 3 | No treatment | 0.10 | 11.5 |
| Comparative Example 4 | Treatment with water containing no lithium compound | 0.09 | 11.0 |

According to the present invention, it is possible to obtain a lithium secondary cell having an improved cell life, which is industrially very useful.

What is claimed is:

1. A lithium secondary cell, comprising a negative electrode comprising, as an active material:
   a carbon material treated with a fluorinating agent, wherein said carbon material treated with a fluorinating agent has substantially no C-F covalent bonds and contains fluorine,
   wherein said active material is prepared by a process comprising treating carbon with a fluorinating agent at a temperature of −100° C to 90° C. for one minute to two days, at a pressure of 1 to 100 mmHg.

2. A lithium secondary cell, comprising a negative electrode comprising, as an active material:

a carbon material treated with a fluorinating agent, wherein said carbon material treated with a fluorinating agent has substantially no C-F covalent bonds and contains fluorine, wherein said active material has at most 0.05 wt % fluorine extractable with an aqueous alkaline solution, and said active material is prepared by a process comprising treating carbon with a fluorinating agent at a temperature of −100° C. to 90° C., for one minute to two days, at a pressure of 1 to 100 mmHg.

3. A lithium secondary cell, comprising a negative electrode comprising, as an active material:

a carbon material treated with a fluorinating agent, wherein said carbon material treated with a fluorinating agent has substantially no C-F covalent bonds and contains fluorine, wherein said active material contains lithium, and said active material is prepared by a process comprising treating carbon with a fluorinating agent at a temperature of −100° C. to 90° C., for one minute to two days, at a pressure of 1 to 100 mmHg.

4. The lithium secondary cell of claim 1, wherein said temperature is 0° to 30° C.

5. The lithium secondary cell of claim 4, wherein said fluorinating agent is fluorine gas alone, or a mixture of fluorine gas and at least one member selected from the group consisting of an inert gas and an oxygen-containing gas.

6. The lithium secondary cell of claim 2, wherein said temperature is 0° to 30° C.

7. The lithium secondary cell of claim 6, wherein said process further comprises contacting said carbon with a steam-containing gas, after said treating with a fluorinating agent.

8. The lithium secondary cell of claim 7, wherein said fluorinating agent is fluorine gas alone, or a mixture of fluorine gas and at least one member selected from the group consisting of an inert gas and an oxygen-containing gas.

9. The lithium secondary cell of claim 7, wherein said steam-containing gas comprises 1 to 60 volume % of steam, and at least one member selected from the group consisting of air and an inert gas.

10. The lithium secondary cell of claim 7, wherein said treating with a steam-containing gas is carried out by contacting said carbon with said steam-containing gas at a flow rate of 50 to 1,000 ml/min at a temperature of 150° to 350° C.

11. The lithium secondary cell of claim 3, wherein said temperature is 0° to 30° C.

12. The lithium secondary cell of claim 11, wherein said process further comprises adding at least one member selected from the group consisting of lithium metal and a lithium compound other than lithium fluoride, to said carbon material, after said treating with said fluorinating agent.

13. The lithium secondary cell of claim 12, wherein said fluorinating agent is fluorine gas alone, or a mixture of fluorine gas and at least one member selected from the group consisting of an inert gas and an oxygen-containing gas.

14. The lithium secondary cell of claim 12, wherein the amount of said at least one member is about 1.5 times by reaction equivalent, to the amount of alkali extractable fluorine in said carbon after said treating with the fluorinating agent.

* * * * *